United States Patent [19]

Tate

[11] Patent Number: 4,593,786
[45] Date of Patent: Jun. 10, 1986

[54] SELF-CONTAINED POWER SUPPLY AND SUPPORT THEREFOR

[76] Inventor: John Tate, 17285 Gehricke Rd., Sonoma, Calif. 95476

[21] Appl. No.: 443,487

[22] Filed: Nov. 22, 1982

Related U.S. Application Data

[63] Continuation-in-part of Ser. No. 373,899, May 3, 1982, abandoned.

[51] Int. Cl.[4] .............................................. B60K 5/10
[52] U.S. Cl. ........................... 180/291; 123/196 AB; 123/557; 180/312; 280/769; 280/782
[58] Field of Search ............... 180/291, 298, 299, 312, 180/69.6; 280/5 A, 782, 789, 769; 296/37.4, 37.6; 224/42.41, 42.23; 62/239; 123/196 AB, 557; 248/228; 108/51.1

[56] References Cited

U.S. PATENT DOCUMENTS

| | | | |
|---|---|---|---|
| 1,648,875 | 11/1927 | Griese | 180/298 |
| 1,925,867 | 9/1933 | Dunlop | 248/228 |
| 2,607,518 | 8/1952 | Cohen | 224/42.41 |
| 2,865,585 | 12/1958 | Beyer | 248/228 |
| 2,895,310 | 7/1959 | Benisch | 62/239 |
| 3,100,384 | 8/1963 | Lowensohn | 62/239 |
| 3,276,800 | 10/1966 | Louden | 248/228 |
| 3,418,003 | 12/1968 | Tate | 280/783 |
| 3,726,424 | 4/1973 | DuPuis | 108/51.1 |
| 3,740,090 | 6/1973 | Lynde | 296/35 R |
| 4,337,737 | 7/1982 | Pechner | 123/196 AB |
| 4,363,431 | 12/1982 | Muschalek | 224/42.23 |
| 4,409,946 | 10/1983 | Sandford | 123/557 |
| 4,411,441 | 10/1983 | Marcheix | 280/5 A |
| 4,416,461 | 11/1983 | Hayashi | 280/5 A |
| 4,440,138 | 4/1984 | Smith | 123/557 |

FOREIGN PATENT DOCUMENTS 1025815  3/1958  Fed. Rep. of Germany ...... 248/228

OTHER PUBLICATIONS

Matson drawings 2220-012A, 2222-012, and SK-422, and three-sheet invitation and bid CP3314—1978.

Primary Examiner—John J. Love
Assistant Examiner—Joseph G. McCarthy
Attorney, Agent, or Firm—Limbach, Limbach & Sutton

[57] ABSTRACT

A low profile support for releasably mounting a portable power supply on a vehicle chassis. The support comprises a framework adapted to be secured beneath the vehicle chassis so as to dispose the power supply between the longitudinal frame members of the chassis. The lowermost member of the framework is a closed tubular frame which may provide an oil reservoir for the lubrication system of the power supply. In one embodiment, the support is extended to provide for suspension of a fuel tank therein. In another embodiment, a chassis mountable fuel tank separate from the power supply support is provided.

2 Claims, 9 Drawing Figures

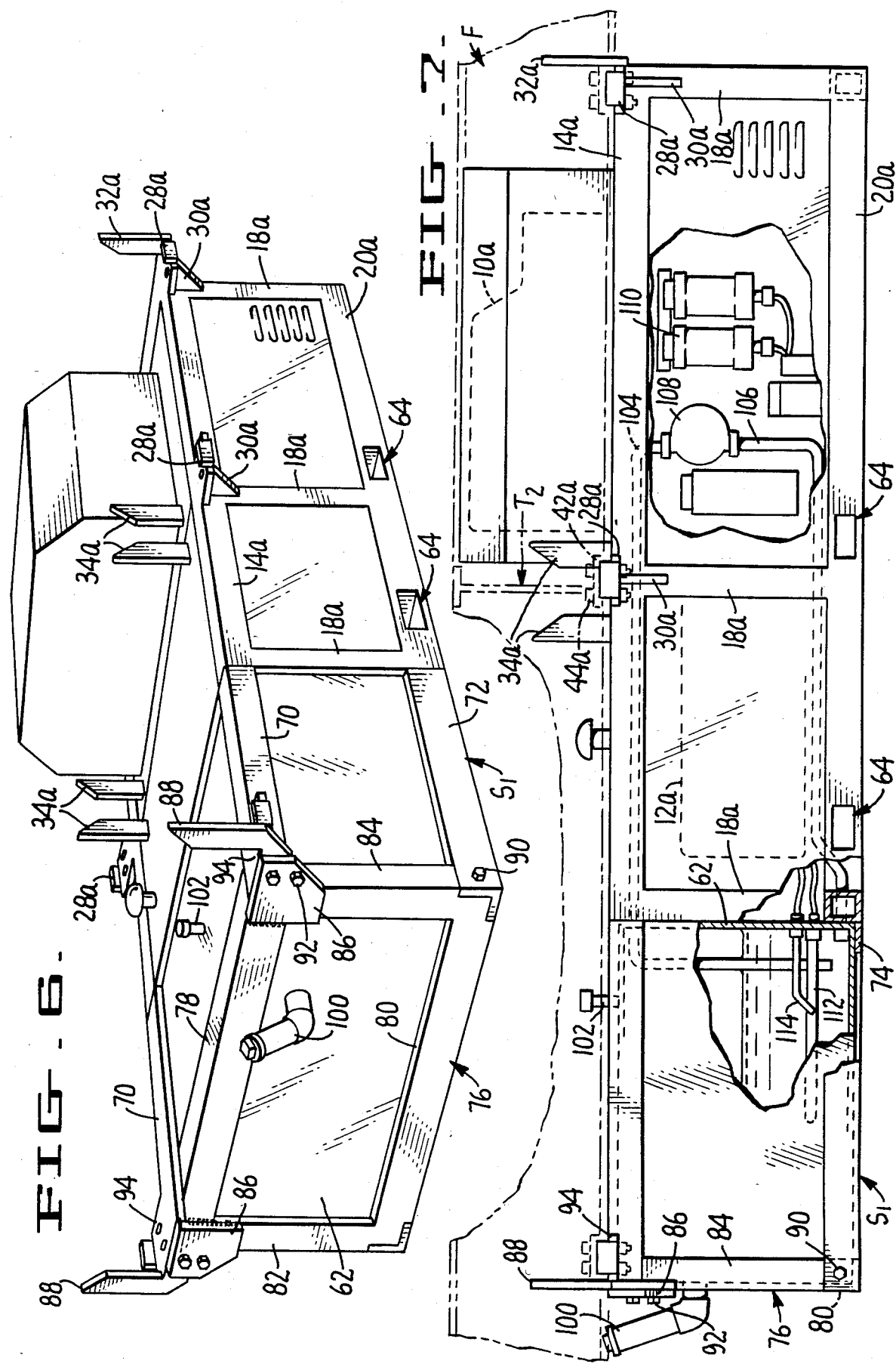

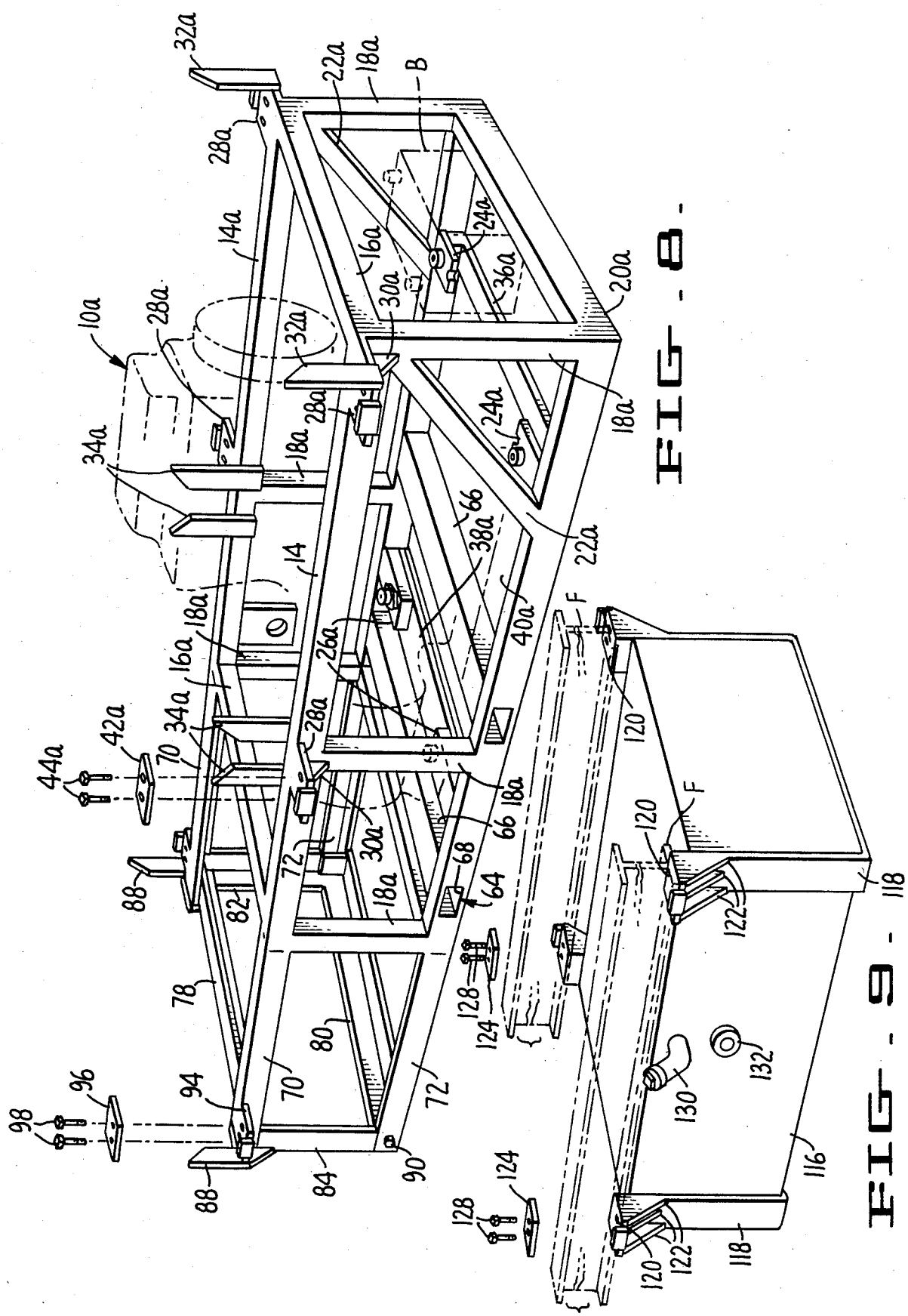

SELF-CONTAINED POWER SUPPLY AND SUPPORT THEREFOR

RELATED APPLICATION

This is a continuation-in-part of my copending application Ser. No. 373,899, now abandoned, filed May 3, 1982 and entitled, "POWER SUPPLY SUPPORT FOR VEHICLE CHASSIS".

BACKGROUND OF THE INVENTION

The present invention relates to a self-contained power supply and a support for releasably mounting such a power supply on a vehicle chassis and, more particularly, is concerned with such a support which has a low profile and is suited for mounting a power supply unit beneath the chassis of a semitrailer.

Portable power supply units are well-known in the prior art. They generally comprise some type of internal combustion engine which drives a generator. Some are supported on their own special chassis, such as that of my prior U.S. Pat. No. 3,418,003. Others are supported on the chassis of existing vehicles, such as semitrailers of the type with which the present invention is designed to be used.

The prior units designed to be supported on existing semitrailer chassis have had the disadvantage that they were of relatively high profile and necessitated mounting to one side of the longitudinal frame members of the chassis. This resulted in eccentric loading of the chassis and also positioned the power supply unit and the support therefor in a position vulnerable to damage.

Power supply units of the type with which the present invention is concerned are frequently employed for continuous operation where little or no attendance is provided. For example, such units may be used to power the refrigeration systems on semitrailers which are transported across country on flatbed railroad cars. This necessitates that the units be of extremely durable construction and provided with an adequate reservoir of lubricating oil and means to cool the oil against overheating. The present invention provides such a reservoir and means by incorporating a supplemental oil reservoir into the frame of the support.

SUMMARY OF THE INVENTION

In its broader aspects, the invention is directed to a support for suspending a power supply unit beneath a vehicle chassis in such manner that the unit is located between the longitudinal frame members of the chassis so as to symmetrically load the chassis and provide a low profile. The support includes upper members which may be detachably secured in place without modification of the chassis and a lower frame member which may provide a supplemental reservoir for lubricating oil.

In its more specific aspects, the invention is directed to a self-contained power supply unit which includes the support, an internal combustion engine suspended within the support, and a power supply generator suspended in the support in driven relationship to the engine. One embodiment of the self-contained unit includes a fuel tank suspended within the support. Another embodiment incorporates a fuel tank separate from the support.

A principal object of the invention is to provide a power supply support which is of a durable construction and of a minimum profile.

Another general object of the invention is to provide such a support which is so mounted as to symmetrically load the vehicle with which it is used and be removed to the greatest extent possible from vulnerability to damage as the result of road hazards and handling.

Still another object of the invention is to provide such a support which may be secured to a semitrailer chassis with little or no modification of the chassis.

Yet another object related to the latter object is to provide such a support which may be mounted at various positions along the length of the chassis of a semitrailer to adjust the axle load of the trailer.

A further object of the invention is to provide a supplemental oil reservoir incorporated into such a support to assure an adequate supply of lubricating oil to the power supply supported thereby and aid in the cooling of that oil.

Still another object of the invention is to provide such a support and oil reservoir wherein the reservoir is incorporated into a structural member of the support so as to be extremely strong and resistant to damage, and not require a "hang-on" type tank.

Yet another object of the invention is to provide such a support which incorporates an underslung low profile mounting arrangement for the power supply unit.

A still further object of the invention is to provide such a support with guide means to facilitate its ready alignment with the vehicle chassis upon which it is mounted.

Another object of the invention is to provide a self-contained power supply unit for suspension beneath a vehicle chassis, which unit may be suspended from the longitudinally extending frame members of the chassis and includes an internal combustion engine, generator and fuel supply tank.

Still another object of the invention is to provide such a self-contained power supply unit which has forklift sockets incorporated thereinto which do not add to the depth of the unit.

Yet another object of the invention is to provide a tank which may be suspended from the transversely spaced longitudinally extending frame members of a vehicle chassis, without extending into the space between said members.

Still another object of the invention is to provide such a tank which has a low profile.

BRIEF DESCRIPTION OF THE DRAWINGS

The foregoing and other objects will become more apparent when viewed in light of the following description and accompanying drawings wherein:

FIG. 6 is a perspective view of a power supply unit embodying the second embodiment of the inventive support.

FIG. 7 is a side elevational view, with parts thereof broken away, showing a power supply unit mounted on a semitrailer chassis through means of the second embodiment of the inventive support.

FIG. 8 is a perspective view of the framework of the second embodiment support, with the engine and generator of a power supply unit diagrammatically shown in phantom and attaching clamps shown in exploded perspective; and FIG. 9 is a perspective view of a separate fuel tank, with the frame members of a vehicle chassis shown in phantom as they would appear with the tank secured thereto, and the chassis securing clamps shown in exploded perspective.

DESCRIPTION OF THE FIRST EMBODIMENT

Figure 1:
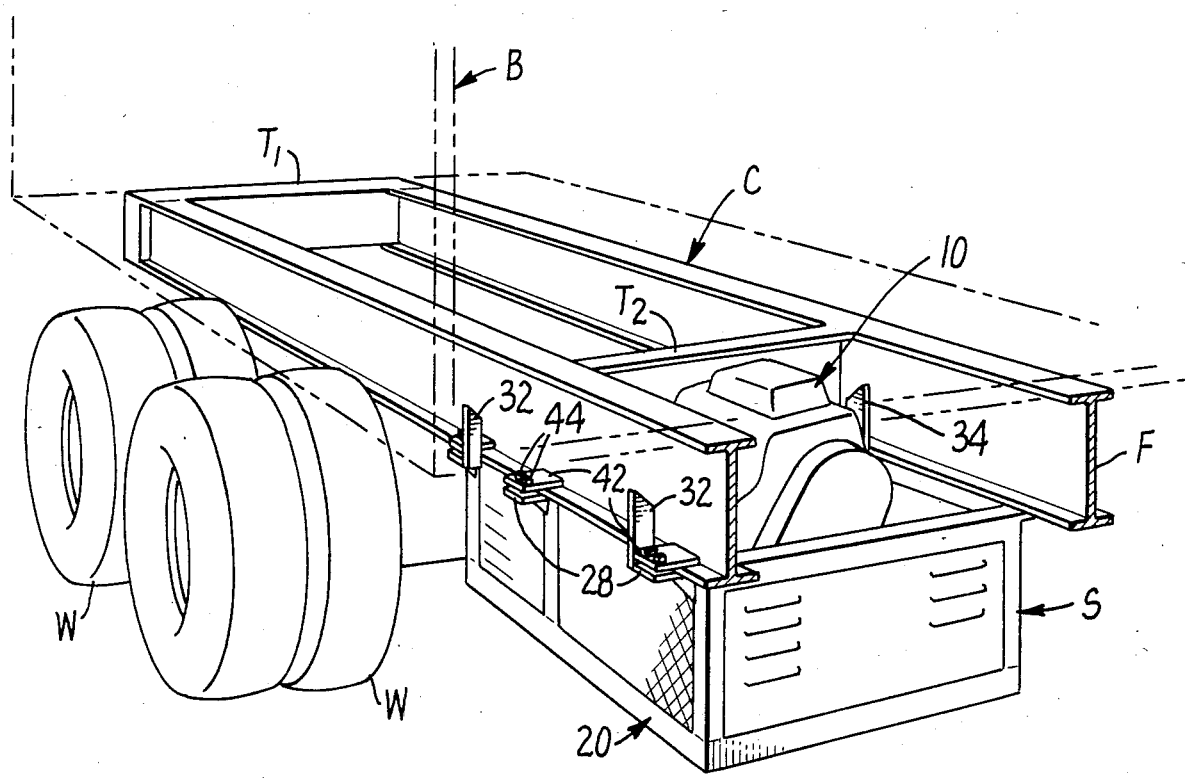
FIG. 1 is a perspective view of a semitrailer chassis, with parts thereof broken away, showing a power supply mounted through means of the first embodiment inventive support.

The semitrailer chassis shown in FIG. 1 is designated in its entirety by the letter C and is shown with a phantom representation of a body $B_1$ supported thereon. The chassis has longitudinally extending frame members F rigidly interconnected by transversely extending frame members $T_1$ and $T_2$. The chassis is supported on wheels W through means of conventional suspension structure (not illustrated).

The support of the present invention is designated in its entirety by the letter S and is shown having a power supply unit mounted therein comprised of an internal combustion engine 10 and a generator 12. The support comprises: upper longitudinally extending members 14; upper transversely extending members 16 fixedly joined to the members 14; a framework fixedly suspended beneath the members 14 and 16; said framework having posts 18 and a rectangular frame 20; brace members 22 connected between the frame 20 and certain of the posts 18; engine mounts 24 and generator mounts 26 fixed to the frame 20; clamp plates 28 fixed to and extending laterally from the members 14, said plates being reinforced by webs 30 connected to the posts 18; transverse positioning guide plates 32 fixed to and extending upwardly from the clamp plates 28 at either end of the framework; longitudinally positioning guide plates 34 fixed to the members 14; a brace member 36 connected across the frame 20 between the mounts 24; and a brace member 38 connected across the frame 20 between the mounts 26.

The bottom of the support is closed by a plate 40. Releasable clamping plates 42 are secured to the plates 28 through means of bolts 44. The frame 20 is rectangular in plan view and comprises a continuous rectangular tube which provides a supplemental lubricating oil reservoir, as will be discussed in more detail subsequently. A filler pipe 46 and oil line fittings 48 and 50 communicate with the reservoir.

FIG. 1 shows side plates in the open sides of the support framework. These are intended primarily for closure and aesthetic purposes. They are not load supporting.

In the illustrated embodiment, the engine and generator are rigidly interconnected so that no intermediate supports therefor are required. The engine is mounted on the mounts 24 and the generator is mounted on the mounts 26. The mounts are provided with elastomeric cushions and bolts extend through these and brackets on the engine and generator to secure the power supply unit in place.

A flexible inlet hose 52 is connected between the fitting 50 and the primary engine oil reservoir provided by the engine pan 53. The connections to line 52 are such that oil can flow from the reservoir provided by the frame 20 into the pan 53 thereby increasing the effective capacity of the pan 53. A vent pressure equalizing pipe 58 is connected from the frame 20 to the engine crankcase through a flexible hose 59 and fitting 60 to insure that temperature, or pressure differences, do not interfere with the gravity flow provided by line 52.

A flexible outlet hose 54 is connected between the fitting 48 and the oil gallery of the engine to cause circulation of all of the oil through the system thereby extending oil change intervals. Flow from the gallery to the reservoir can be controlled by a thermostatically controlled solenoid valve 56 interposed in the hose 54. The valve 56 is provided so that engine oil will not circulate through the reservoir provided by the frame 20 until such time as the engine oil reaches operating temperature. The provision of such control assures that the reservoir provided by the frame 20 will not overcool the engine oil. Other means may be provided to assure that overcooling of the oil does not occur. For example, if the engine is air-cooled, the control may be effected by thermostatic control of the cooler blower.

Once the engine and generator have been mounted within the support, securing the support to the semitrailer frame is a simple process. All that is required is that the unit be lifted against the underside of the vehicle chassis, as for example, by means of a forklift. During the lifting process, the clamping plates 42 would be removed. As the unit is lifted, the guide plates 32 pass to either side of the frame members F to center the support transversely of the chassis and the guide plates 34 pass to either side of the transverse member $T_2$ to position the assembly longitudinally of the chassis. When fully elevated, the members 14 engage the underside of the frame members F and the releasable clamping plates 42 are positioned in place and secured through means of the bolts 44. Thus, the flanges of the frame members F are securely engaged between the fixed clamp plates 28 and the releasable plates 42 (see FIGS. 4 and 5) and the support is securely anchored in suspended relationship to the trailer chassis.

Figure 3:
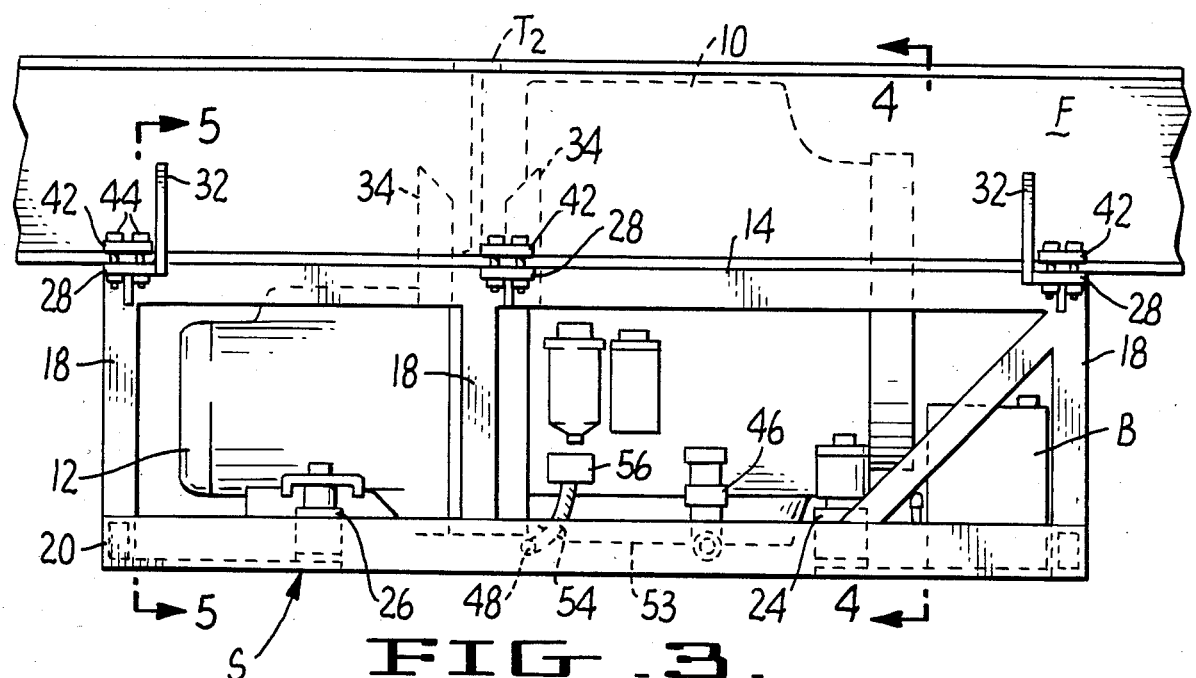
FIG. 3 is a side elevational view of the first embodiment support, shown mounted on the chassis of a semitrailer, with the power supply in place and the side panels of the support removed to expose the power supply to view.
Figure 4:
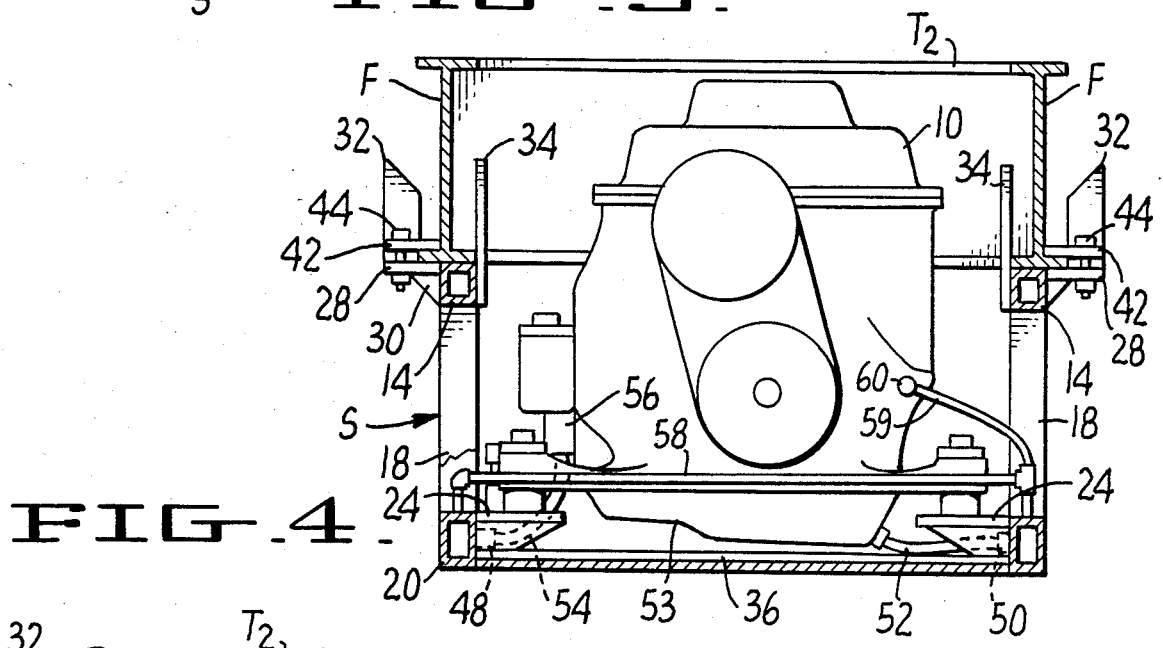
FIGS. 4 and 5 are cross-sectional elevational views taken on the planes designated by lines 4—4 and 5—5, respectively, of FIG. 3.

From FIGS. 3 and 4, it will be seen that the upper end of the engine 10 is received within the space between the frame members F. This "nested" interrelationship materially reduces the degree to which the power supply and support assembly hang beneath the trailer chassis. It provides a profile which is only slightly in excess of one-half of that which would be required if the support were of the type where the entire assembly is positioned beneath the frame members of the trailer chassis.

Figure 2:
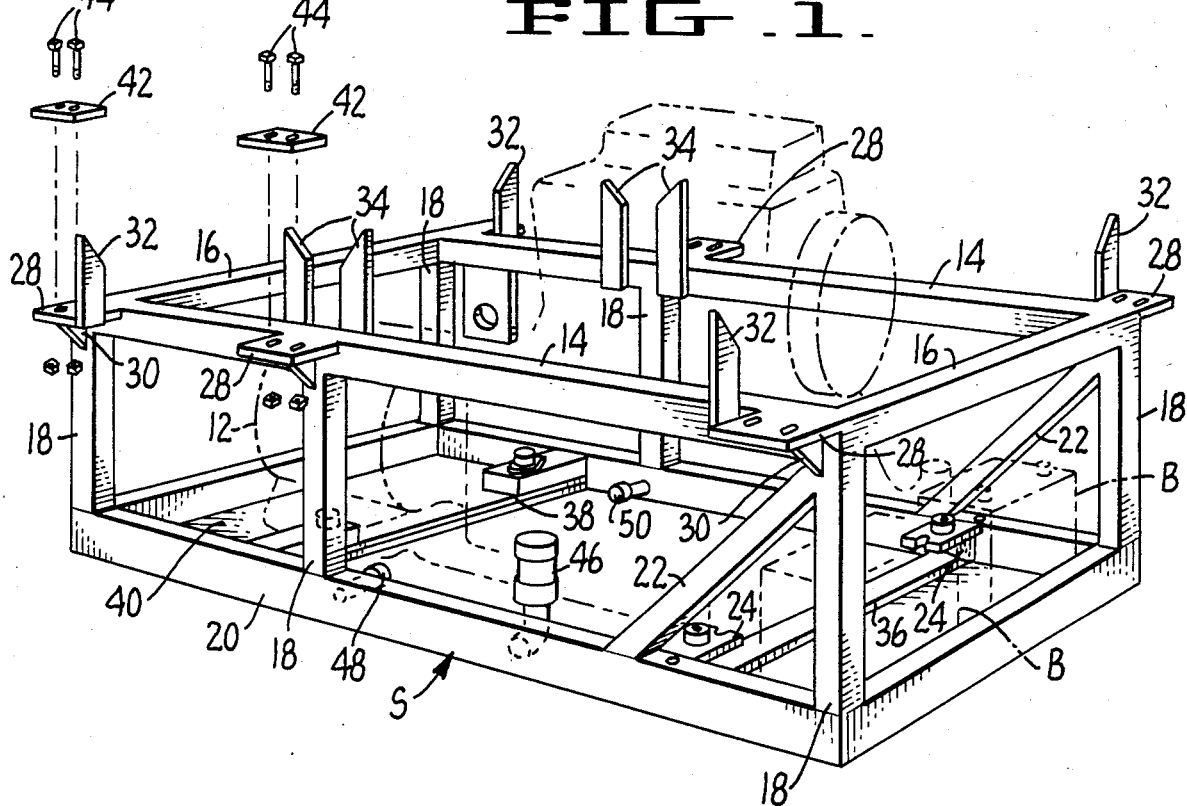
FIG. 2 is a perspective view of the framework of the first embodiment support, with the power supply diagrammatically shown in phantom and attaching clamps shown in exploded perspective.
Figure 5:
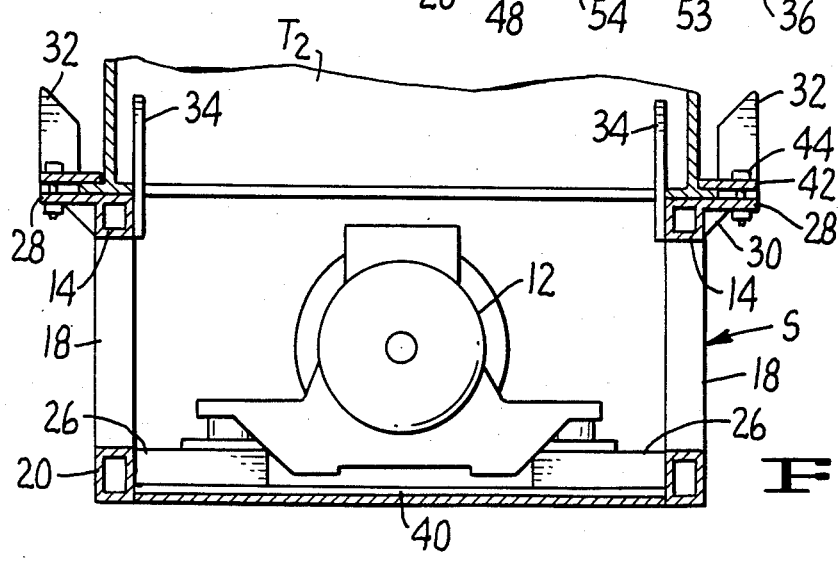

FIGS. 4 and 5 also show how the engine and generator are underslung relative to the mounts therefor so as to further minimize the profile of the assembly. FIGS. 2 and 3 show that the space to the engine end of the support accommodates batteries B.

DESCRIPTION OF THE SECOND EMBODIMENT

The second embodiment is shown in FIGS. 6, 7 and 8. It differs from the first embodiment primarily in that the support, designated $S_1$, has an extension for carrying a fuel tank 62 and that its rectangular frame, designated 20a, is provided with forklift sockets 64 and does not serve as an oil reservoir.

The elements of the support S₁ are designated by numerals corresponding to those of the first embodiment, followed by the letter "a" as follows: upper longitudinally extending members 14a; transversely extending members 16a fixedly joined to the members 14a; a framework fixedly suspended beneath the members 14a and 16a, said framework having posts 18a and a rectangular frame 20a; brace members 22a connected between the frame 20a and certain of the posts 18a; engine mounts 24a and generator mounts 26a fixed to the frame 20a; clamp plates 28a fixed to and extending laterally from the members 14a, said plates being reinforced by webs 30a connected to the posts 18a; transverse positioning guide plates 32a fixed to and extending upwardly from the clamp plates 28a at one end of the framework; longitudinally positioning guide plates 34a fixed to the members 14a; a brace member 36a connected across the frame 20a between the mounts 24a; a brace member 38a connected across the frame member 20 between the mounts 26a; and a bottom plate 40a. As with the corresponding elements of the first embodiment, the following elements of the support S₁ are of a tubular rectangular cross-section: members 14a; members 16a; posts 18a; frame 20a; and brace members 22a. The frame 20a, however, is not used as an oil reservoir. Additionally, the forklift sockets 64, defined by tubes 66, are fixed to and extend transversely across the frame 20a and open through the lateral sides thereof at openings 68.

The support for the fuel tank 62 is fabricated of members of right-angle shaped cross-section having the sides thereof defining right angles therebetween facing inwardly. These members comprise: upper members 70 fixed to and extending longitudinally from the members 14a; lower members 72 fixed to and extending longitudinally from the longitudinal elements of the frame 20a; a transversely extending lower member 74 fixed to and extending transversely of the frame 20; and a rectangular end member 76 removedly secured to the distal ends of the members 70 and 72.

The end member 76 is fabricated of top and bottom angle members 78 and 80 interconnected by side angle members 82 and 84. As can be seen from FIG. 6, the end member is received within the distal ends of the upper and lower members 70 and 72. Securing plates 86 are carried by the ends of the member 78 for juxtaposition with guide plates 88 fixed to the members 70. Bolts 90 secure the members 72 to the bottom of the end member 76. Bolts 92 secure the plates 86 to the plates 88 and, thus, secure the top of the end member 76 to the members 70. Through release of the connection provided by the bolts 90 and 92, the end member 76 may be released to permit the tank 62 to be removed.

Clamp plates 94 are fixed to and extend laterally from the members 70 in coplanar relationship to the upper surfaces thereof. These plates serve a function similar to the plates 28a. As shown, the guide plates 88 are welded to the clamp plates 94. Releasable clamping plates 96 cooperate with the plates 94 and may be secured thereto by bolts 98. Releasable clamping plates 42a cooperate with the plates 28a and may be secured thereto through means of bolts 44a.

In the assembled condition, an engine 10a and generator 12a are mounted within the support S₁ in the same manner that the engine 10 and generator 12 of the first embodiment are mounted. Additionally, the tank 62 is mounted within the extended framework. The member 20a provides a full perimeter frame of tubular cross-section around the engine and generator. The members 72, 74, and 80 provide a full perimeter frame around the tank 62.

A filler pipe 100 provides for the charging of fuel into the tank and a vent 102 communicates with the top of the tank so it will not become air locked. Fuel lines 104 and 106 are connected between the tank 62 and a fuel pump 108 on the engine 10a. A heated fuel bowl 110 on the engine communicates with the pump 108. In the preferred embodiment, the fuel bowl is heated through means of a thermostatically controlled direct current coil powered from the starter battery B (see FIG. 8) for the engine.

The tank 62 is also provided with a thermostatically controlled heater. This heater comprises a heating coil 112 and a thermostatic sensor 114, both of which are positioned so as to be immersed in the fuel within the tank. The heating coil is provided to heat diesel fuel contained within the tank and powered by power from the generator 12a.

From FIG. 6 it will be seen that the support S₁ is provided with covers to shield the engine and generator. This shielding includes a hood over the top of the engine, which hood is the only structure which extends upwardly from the support. Although the tank 62 is shown as being exposed, this may also be shielded with side panels for aesthetic and insulating purposes.

In use, the second embodiment power supply unit is mounted in a manner similar to that of the first embodiment. To lift the unit into place, a forklift is engaged in the sockets 64 and then the unit is lifted against the underside of a vehicle chassis, such as that shown in phantom in FIG. 7. During the lifting process, the clamping plates 42a and 96 would be removed. As the unit is lifted, the guide plates 32a and 88 pass to either side of chassis frame members to center the support transversely of the chassis and the guide plates 34 pass to either side of a transverse chassis member (see FIG. 7) to position the assembly longitudinally of the chassis. When the support S₁ is fully elevated, the members 14a and 94 engage the underside of the longitudinal chassis frame members and the releasable clamping plates 42a and 96 are positioned in place and secured through means of the bolts 44a and 98. Thus, the support is secured to the lower flanges of the longitudinal chassis frame members in suspended relationship.

In the suspended condition, the hood for the upper end of the engine is received in the space between the longitudinally extending frame members of the chassis. The generator and tank, however, are disposed beneath the lowermost level of the frame members. Thus, the support S₁, like the support S, may be mounted at any position along the length of a trailer chassis so long as there is sufficient room between the transversely extending chassis members for receipt of the upper end of the engine. This characteristic is particularly advantageous since it means that the support may be suspended from a chassis with conventionally spaced transversely extending frame members. It is not necessary that sufficient space be provided to accommodate anything more than that portion of the engine which extends upwardly from the support.

The second embodiment is particularly advantageous in that it provides a fully self-contained power supply unit, including the fuel tank therefor. It also provides for heating of the fuel and for shielding of the fuel tank from the environment and the chill factor which may result from wind. Such heating and shielding is particularly desirable where the engine is of the diesel type, since diesel fuel typically contains water impurities and waxes which can result in fouling of the fuel system at very low temperatures. In the preferred arrangement, the unit is mounted so that the fuel tank is at the trailing end and, thus, isolated from wind chill and, to a degree, heated by the normal heat dissipated from the engine and generator.

DESCRIPTION OF THE INDEPENDENT TANK

The tank shown in FIG. 9 may be used to provide the fuel source for the first embodiment power supply, or an auxilliary fuel supply for the second embodiment power supply. It is designed to be clamped to and beneath the longitudinally extending frame members of a vehicle chassis. No part of the tank extends above the chassis frame members. Thus, the tank may be positioned at any desired longitudinal position to adjust axle loading.

The tank, designated 116, is of rectangular configuration and has stirrup-like frames 118 fixed to the ends thereof. Each frame is of generally U-shaped configuration and carries at its upper distal extremities clamp plates 120 spaced upwardly from the upper surface of the tank. Web reinforcements are secured between the plates and the vertically extending portions of the frame members 118. Releasable clamping plates 124 cooperate with the plates 120 to secure the frames 118 to the longitudinal frame members of a chassis frame. Bolts 128 are provided to secure the releasable plates 124 to the clamp plates 122.

As shown in FIG. 9, a filler pipe 130 communicates with the top of the tank and a gauge 132 is mounted on the side of the tank. Although not illustrated, it should be understood that the gauge 132 is connected to a fluid level sensing mechanism disposed within the tank.

In use, the independent tank is mounted in a manner very similar to that of the first and second embodiment power supply units. All that is required is that the tank be lifted against the underside of a vehicle chassis, as for example, by means of a forklift. The tank is lifted so that the top sides of the plates 120 engage beneath the longitudinally extending frame members of the vehicle chassis. Once so positioned, the releasable clamping plates 124 are fastened in place and, thus, the tank is suspended from the chassis.

CONCLUSION

Although the illustrated power supply units are provided with plates 34 and 34a to establish a fixed longitudinal positioning of the supports relative to the trailer chassis, it should be understood that these plates may be omitted, or so used as to be nonfunctional, where it is desired to provide for adjustable longitudinal positioning of the units relative to a trailer chassis. Such adjustability enables the support to be moved longitudinally to vary the axle loading of the trailer wheels.

It should also be understood that the invention is not intended to be limited to the specifics of the illustrated embodiments, but rather is defined by the accompanying claims.

What is claimed is:

1. In combination with a wheel supported vehicle chassis having transversely spaced longitudinally extending frame members, an improved support for a power supply having an engine with an oil reservoir, said support comprising: longitudinally extending upper members spaced from one another by approximately the same distance as the longitudinally extending frame members of the chassis, said upper members defining therebetween an open space through which a power supply unit may extend; a downwardly depending framework carried by and rigidly interconnected with said longitudinally extending upper members, said framework having mounting means to mount a power supply within the framework with the upper end of the supply extending upwardly between the upper members; a closed loop tubular member included within and forming at least a portion of said framework to provide a supplemental oil reservoir for said engine; conduit means to establish fluid communication between the reservoir of the engine and said supplemental oil reservoir; thermostatic control means to control the flow of oil from said supplemental reservoir to the oil reservoir of the engine; and clamp means carried by said upper members to releasably clamp said members to the longitudinally extending frame members of the chassis.

2. In a combination according to claim 1, the improved power supply support wherein the closed loop tubular member is a rectangular frame which comprises the lowermost structural element of the framework.

* * * * *